July 26, 1960
H. H. HOWARD
2,946,446
FILTRATION UNITS
Filed Sept. 17, 1958
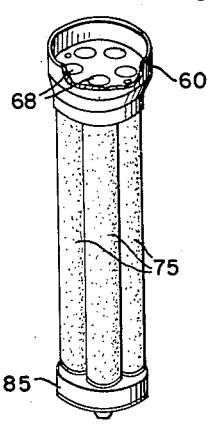
FIG. 1.
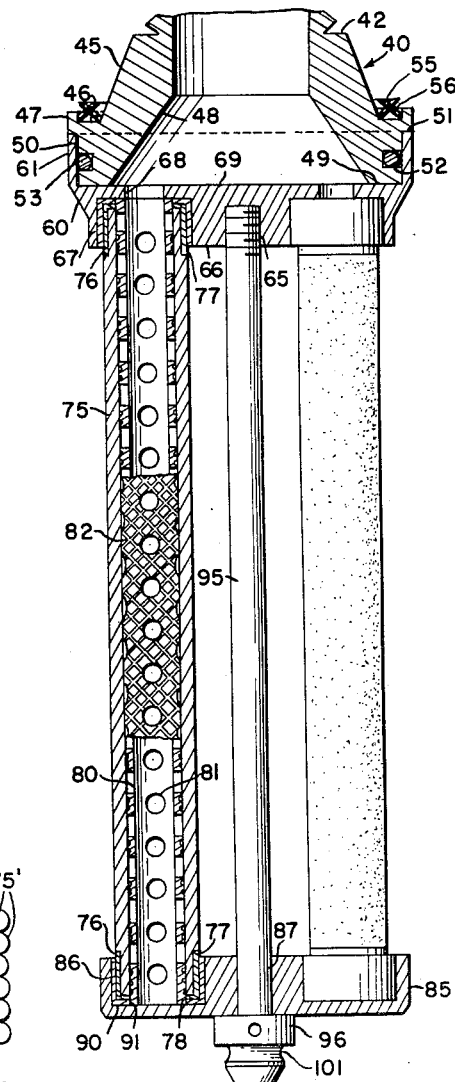
FIG. 2.
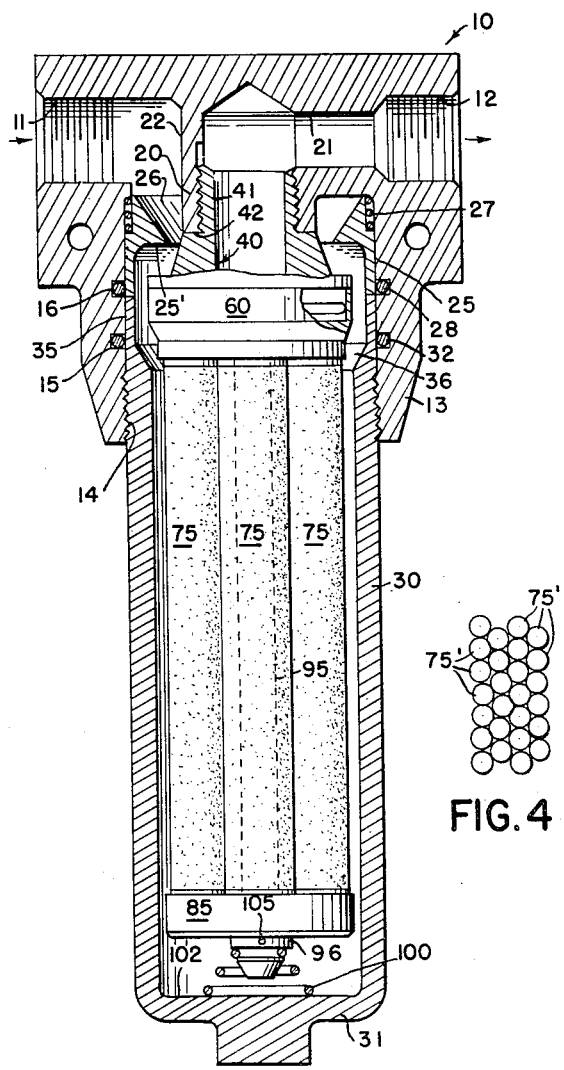
FIG. 3
FIG. 4
INVENTOR
HERBERT H. HOWARD
BY *Arthur Middleton*
ATTORNEY

United States Patent Office 2,946,446
Patented July 26, 1960

2,946,446

FILTRATION UNITS

Herbert H. Howard, Los Angeles, Calif., assignor to Permanent Filter Corporation, Los Angeles, Calif., a corporation of California Filed Sept. 17, 1958, Ser. No. 761,490

9 Claims. (Cl. 210—323)

This invention relates to filter apparatus of the type used for removing micronic size contaminants from a filtrant such as is now common to aircraft of the jet and missile types. Such filters comprise a casing or housing having a filtrant inlet and a filtrate outlet, while included within the casing is a filter element having some type of permeable metallic filter media through which only filtrate passes.

In jets and missiles, both space and weight must be minimized, so it is an object of this invention to design filters of this type to occupy a minimum of space and to be of minimum weight, yet without sacrificing efficiency. Since filters for use on fuels and oils designed for such aircraft use, must work under pressure and must do their filtering with assurance that the filtrate will be free of micronic contaminants, it is another object of this invention to design such a filter that its filter element is more particularly a multiple filter unit that is also quickly removable for cleansing and for replacement.

Since it is necessary to conserve size and weight as much as possible in such applications, it is a particular object of this invention to provide a filter apparatus within a certain size envelope of a certain weight which provides maximum filtering action in the most efficient manner. Such filters must also have very high contaminant holding properties in order to successfully accomplish their mission, and at the same time the construction must be of the type which facilitates fabrication and removal of the various components thereof in order that the device may be quickly and easily disassembled and cleaned when necessary.

This is accomplishable by using a new filtration complex removable as a unit from the filter casing and having as its filter media a plurality of small permeable or porous metallic cylinders made up of micronic size sintered bronze spheres having tangential points of contact, with each cylinder having substantially 40% voids. Such small cylinders are open ended but have a cap or cover plate closing off the bottom end of the cylinders, and have at the top end of the cylinders a cap or cover plate provided with an aperture aligned with the open end of each cylinder through which the filtrate can flow to the filtrate outlet of the casing that houses the cylinders. So it is another object of this invention to devise ways and means whereby such filtering cylinders can be mounted in their cap or cover plates in a way that permits quick disassembly for cleaning and quick re-assembly of the filter unit.

Since the filter is to filter out of a pressured feed of filtrant micronic size contaminants, it is a further object of this invention to devise ways and means for removably seating the ends of the cylinders in their cover plates under conditions that assure no leakage past the ends of the cylinders and their cap or cover plates, irrespective of the pressures exerted thereon.

This invention is directed to a type of filter having an enclosing casing with a feed inlet for the filtrant and an outlet for the filtrate, while within the casing is a filter media cylinder of very small sintered metallic spheres. The filtrant from the feed inlet to which it is fed under pressure submerges the cylinder. Filtrate passes through the porous cylinder walls while contaminants collect slowly as filter cake on the exterior of the cylinders. Filtrate flows axially through the interior of the cylinder to exit as filtrate from the filtrate outlet of the cylinder-enclosing casing. Filters of this type are in effect batch operated because when the exterior of the cylinder becomes blinded with contaminants and as a consequence the pressure drop across the cylinder becomes significant, the filter is shut down; the cylinder removed from the casing for cleansing of its filter cake; and finally replaced in the casing, whereupon the filter can be put "in line" again.

So the novelty of this invention resides in the ways and means by which a plurality of such cylinders of sintered spheres in matrix form are made into a removable filter unit having a closed bottom cover plate and a top with an aperture aligned with each cover plate cylinder; and by which the cylinders are removably but sealingly seated in their cover plates. Such a unit with its cylinders clamped between the cover plates is removable from the filter casing or housing for cleansing or repairing, meanwhile being replaced by a fresh filter unit. By the use of a number of small cylinders of this type in one filter unit, the unit and its housing can be made surprisingly small while still maintaining a high rate of filtration of micronic size contaminants. Features of novelty also reside in details of construction and arrangement of the ferrules at each end of the cylinders of sintered spheres; of the nylon cup-shaped seats for the ends of such cylinders; and in particular parts and relationships set forth hereinafter.

It is a still further object of the present invention to provide a filter apparatus in accordance with the foregoing objects which is quite simple, inexpensive and compact in construction, and yet which is quite efficient and reliable in operation.

Other objects and many attendant advantages of the present invention will become more apparent when considered in connection with the accompanying specification and drawing wherein:

Fig. 1 is a perspective view of the filter unit according to the present invention;

Fig. 2 is an enlarged longitudinal section of the filter unit shown in Fig. 1 mounted in operative position upon a portion of the body means;

Fig. 3 is a sectional view illustrating the filter unit mounted in operative position in the body means; and Fig. 4 is a greatly enlarged portion of the wall of one of the filter elements.

Referring now to the drawing wherein like reference characters designate corresponding parts throughout the several views, there is shown in Fig. 3 body means indicated generally by reference character 10 comprising a fitting adapted to be inserted in the fuel line of a jet aircraft for example, the body means having a threaded inlet 11 and a threaded outlet 12 to which suitable fuel lines may be attached. A downwardly extending boss 13 has a central opening 14 formed therein having a lower threaded portion and an upper relatively smooth portion within which two circumferentially extending grooves 15 and 16 are formed. The upper end of opening 14 surrounds a downwardly projecting cylindrical extension indicated by reference numeral 20 and the interior of which is threaded and which is in communication with threaded outlet 12 by means of laterally extending passage 21. It is evident that the upper portion of opening 14 is in communication with inlet 11 through the intermediary of passage 22.

A shut-off seat member 25 is substantially annular in configuration, and has a central opening defined by downwardly tapering walls 26 at the upper end thereof. The outer wall of seat 25 is in engagement with the inner smooth wall of opening 14, and an annular recess is provided in the upper portion of the outer wall of the seat member within which a spring 27 is disposed for normally urging seat 25 in a downward direction. An O-ring seal 28 is disposed within recess 16 in body member for providing a tight fluid seal between the body means and the seat member 25.

A cover member 30 is formed as a substantially cylindrical hollow member having a closed end 31, the opposite end of which is opened and tightly received within opening 14 formed in boss 13. The upper end of cover member 30 has an external thread formed thereon which cooperates with the thread formed in the lower portion of opening 14 for securing cover member 30 in position on the body means. The smooth upper portion of the outer wall of cover member 30 bears against an O-ring seal 32 disposed within recess 15 in the body means for providing a fluid seal between the cover member and the body means. Each of O-rings 28 and 32 may be of a suitable substance such as neoprene or the like. It should be noted that the uppermost wall portion 35 of cover member 30 is relatively thin and tapers downwardly and inwardly along surface 36 to a substantially greater thickness throughout the remaining lower wall portion of the cover member.

A support member 40 has an upwardly extending reduced portion 41 with screw threads formed on the outer surface thereof which are received within the corresponding screw threads formed on the inner surface of the downwardly projecting cylindrical extension 20, the shoulder 42 formed on support member 40 seating against the lower edge of the extension 20.

Referring to Fig. 2, the outer surface 45 of support member 40 below shoulder portion 42 tapers downwardly and outwardly and connects with a lower wall 46 which extends radially outwardly and terminates in an upwardly extending flange 47. The inner surface 48 of the lower portion of hollow support member 40 also tapers downwardly and outwardly to a flat bottom surface 49 which extends radially outward and joins the peripheral surface 50 which extends upwardly and connects with a radially extending surface 51 defining the lower surface of flange portion 47. A circumferential recess 52 is formed in the outer surface 50 and an O-ring seal 53 is disposed within the recess.

A sealing ring 55 having a cross-shaped sectional configuration and formed of suitable material, such as neoprene, is disposed within the recess 56 defined between flange portion 47 and the outer surface 45 of the support member. This sealing ring cooperates with the shut-off seat member 25 in a manner hereinafter described.

As seen in Fig. 2, a top cover plate 60 has a substantially circular plan configuration and includes an upwardly extending annular rim 61 which fits tightly about the outer surface 50 of the support member, whereby the top cover plate may be force fitted on the support member with a fluid seal maintained therebetween by O-ring seal 53.

The top cover plate has a central threaded recess 65 formed in the lower surface 66 thereof, and four symmetrically disposed equally spaced recesses 67 are also formed within lower surface 66 of the top cover plate. Each of the recesses is substantially cylindrical in configuration and an opening 68 of smaller diameter than recess 67 is formed through the upper surface 69 of the top cover plate for providing communication between each of the recesses and the hollow interior of the support member 40.

Four equally spaced cylindrical filtering elements 75 are provided, each of the filtering elements being hollow and defining a porous rigid lattice. The lattice is formed of brass spheres or other suitable material which are put in a mold to provide the desired central passage, and the lattice is then sintered in a tunnel kiln or the like. The brass spheres of the filter element have tangential points of mutual contact as indicated by the individual spheres 75' shown in Fig. 4 of the drawing, thereby providing wall portions in the elements having substantially 40% voids. The size of the spheres and the corresponding passages defined therebetween may be chosen in accordance with the requirements of the particular application, and for the purpose herein described the size of the passages ordinarily ranges between 10 and 40 microns for practical purposes. Where the matrix is to be used for holding back say 98% of all particles 10 microns in size and larger, the matrix can be made up of sintered bronze spheres. The spheres can be sized as follows: 2% maximum having a diameter of plus 60 screen mesh; 55–85% plus 80 screen mesh; 10–35% plus 100 screen mesh; and 10% maximum plus 150 screen mesh with the starting spheres being about 90% copper with a tin coating of about 10%. If the matrix is for holding back, say 98% of all particles 20 microns in size or above, the matrix can be made up on such spheres of about 95% copper with a coating of about 5% tin, and the spheres used can be 1% maximum of plus 40 screen mesh, 98% minimum of plus 50 screen mesh; and 1% maximum of plus 60 screen mesh. If the matrix is for holding back say 98% of all particles 40 microns or larger, there should be used 3% maximum of plus 30 mesh; 95% minimum of 40 screen mesh; and 3% maximum of plus 50 screen mesh. The "plus" in the foregoing designates particles that will remain on the given sieve size.

The opposite end portions of each of the filter elements 75 are provided with annular recesses 76, and substantially cup-shaped ferrules 77 are disposed about the end portions of the elements such that the outer surface of the ferrule is flush with the outer surface of the filter element, and the bottom wall portion of the cup-shaped ferrules covers the end portions of the cylindrical filter element. The central portion of the lower wall of each of the cup-shaped ferrules 77 is provided with a central opening 78 formed therethrough such that the inner diameter of opening 78 is substantially equal to the inside diameter of cylindrical filter elements 75.

A foraminous tubular member 80 formed of a suitable light metallic material, such as a magnesium alloy or the like, has an outer diameter substantially equal to the inner diameter of tubular filter element 75, a plurality of similar openings 81 being disposed in staggered relationship and formed through the wall thereof. Tubular element 80 serves to reinforce filter element 75 and rigidify the construction of the apparatus. The outer surface of tubular element 80 is provided with a plurality of grooves 82 which criss cross with one another and provide a plurality of channels around the outer surface of the tubular element and providing communciation between the various openings therethrough.

A lower cover plate 85 is provided with four recesses 86 similar to the recesses 67 formed in the top cover plate, and a central opening 87 is formed therethrough. Seated within each of recesses 67 in the top cover plate and recesses 86 in the lower cover plate is a substantially cup-shaped sealing member 90 formed of a suitable plastic material, such as nylon or the like. Sealing members 90 are tightly fitted within the associated recesses and are provided with an opening 91 therethrough having substantially the same dimension as openings 78 formed in the ferrules 77.

The apparatus is assembled by placing each of the cylindrical elements 75 along with the foraminous tube 80 therein between the top and bottom cover plates such that opposite ends of the filter element and foraminous tube are seated within a pair of aligned recesses in the top and lower cover plates. A clamping bolt 95 is then inserted through opening 87 in the lower cover plate, the upper end portion of the clamping bolt being threaded within threaded openings 65 in the top cover plate. An enlarged collar 96 formed on the lower end of the clamping bolt abuts the lower surface of the lower cover plate for urging the lower cover plate toward the top cover plate, thereby clamping the filter elements between the two cover plates and securing them in rigid fixed operative position.

As clamping bolt 95 is tightened, the ferrules 77 at the ends of each of the filter elements 75 will seat within the sealing members 86, the resiliency of which provides a very efficient seal therebetween. Tube 80 is of greater length than filter element 75 and projects beyond the opposite end portions thereof such that the opposite ends of the tube seat flush against the lower walls of the associated recesses in both the top and lower cover plates. This particular interrelationship provides a very effective and compact method of clamping the opposite ends of the individual filter elements between the cover plates and providing a good fluid seal therebetween.

Referring again to Fig. 3, the top cover plate is initially mounted upon support member 40 by forcing the rim 61 of the top cover plate around the outer surface 50 of the support member. Cover member 30 is then mounted in place within opening 14 in boss 13, a compression spring 100 being received within a circumferential spring receiving groove 101 formed at the lower end of the clamping bolt, spring 100 abutting the lower inner surface 102 of cover member 30 whereby when the cover member is in position as shown in Fig. 3, spring 100 urges the filter unit including the top and lower cover plates and the clamped filter elements in an upward direction. An opening 105 is provided diametrically through collar portion 96 of the clamping bolt for receiving a suitable wrench to facilitate mounting and removal of the clamping bolt.

It is evident that when the device is mounted in operative position as shown in Fig. 3, filtrant enters through inlet 11 and flows downwardly through the central opening in shut-off seat 25 and within the cover member 30 to completely surround and submerge the filter elements 75. In conventional applications, the fluid pressure may be on the order of 3,000 p.s.i., such pressure serving to force the fluid through the porous cylindrical filter elements 75 whereby solid contaminants of greater size than the passage in the filter element will be prevented from passing. The filtered fluid will then pass through grooves 82 to the various openings 81 and into the interior of the tubular elements 80. The fluid will then flow through openings 68 provided in the top cover plate and thence through the hollow interior of support member 40 and out through outlet 12. In this manner, a very effective and efficient filtering action is obtained, the filtering apparatus being quite compact and yet presenting a large filtering area having high contaminant holding properties.

It is apparent that after a certain period of use, the outer surface of the various filter elements will become clogged by a cake of contaminant which will be formed thereon, thereby substantially reducing the efficiency of the filtering unit. When this occurs, the various filtering elements can be quickly and easily replaced as well as an entire filtering unit including the top and lower cover plates and the filtering elements clamped therebetween. For example, when the filtering elements become excessively clogged, cover member 30 may be removed by unscrewing it from its position within boss 13. As cover member 30 is removed, shut-off seat 25 is urged downwardly by spring member 27 such that the undersurface 25' thereof engages the sealing ring 55 disposed about the upper surface of support member 40 thereby preventing any leakage of additional fuel from the inlet into the filtering apparatus. After cover member 30 has been removed, an entire filter unit, including the top and lower cover plates and the clamped filter elements, may be removed from about support member 40, and a new filter unit may be inserted in its place, or if desired, the filter elements 75 may be cleaned and then the same unit replaced. It is also apparent that units themselves may be disassembled so as to remove the individual filter elements 75, and that the filter elements may be individually cleaned or replaced as desired. The apparatus is reassembled merely by reversing the aforedescribed procedure.

It is apparent from the foregoing that there is provided a new and novel filter apparatus which is adapted to remove micronic size contaminants from a filtrant and which occupies a minimum of space, and is very light in weight. In a typical installation wherein the length of the filter elements 75 is approximately 4½ inches, the overall dry weight of the filter apparatus is approximately 3½ inches. The filter apparatus is adapted to operate under relatively high pressures and is especially suited for quick assembly and disassembly whereby the filter elements may be quickly and efficiently replaced or cleaned. The filter assembly according to the present invention has high contaminant holding properties and is very simple, inexpensive and compact in construction, yet is quite efficient and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A filter of the class described, having an enclosing casing with a removable bottom section as well as an inlet for filtrant under pressure and an outlet for filtrate, a filtration unit removable from the casing when the casing's bottom section is removed having a filtrate delivery end, means for leading the pressure feed of filtrant from the inlet thereof to encircle and submerge the filtration unit, and means for leading filtrate from the filtration unit to the filtrate outlet of the casing; said filtration unit comprising a plurality of open-ended cylinders of filter-media formed of sintered metallic spheres having tangential points of mutual contact, a depression-bearing bottom cover plate enclosing the lower ends of the cylinders, a depression-bearing top cover plate against which the upper ends of the cylinders are held with the cover plate having an aperture in each depression aligned with each cylinder through which filtrate can flow, means for securing the cover plates together with the cylinders therebetween, and plastic cylinder-seating leak-proof means in each depression in each cover plate for removably frictionally engaging the end of a cylinder in each depression whereby said cylinders may be readily removed from said cover plates.

2. Apparatus according to claim 1, with the addition that each cylinder has within it a smaller metallic perforated sleeve for reinforcing the cylinder of sintered spheres while the sleeve is longer than the cylinder so that the sleeve projects from the filtrate discharge end thereof, and the leak-proof seating means is cup-shape with an aperture axially through the center of the cup whereby the cup engages the end of the cylinder while the top of the sleeve projects through the aperture thereof and into aligned but leak-proof contact with the aperture in the top cover plate.

3. Filtration equipment comprising an enclosed casing having a body portion with a pressured feed of contaminant-bearing filtrant; an inlet for such filtrant and a filtrate outlet; said body portion being in parts of which one is removable from the other; and a filtering unit submergible in filtrant in the casing that is insertable into and removable from one of said parts when the other is removed and comprising at least a porous metal cylinder through the pores of which filtrate passes while contaminant remains on the exterior of the cylinder, an apertured top cover plate with its aperture aligned with the bore of the cylinder and with its aperture communicating with the filtrate outlet of the casing, a bottom plate closing the other end of the cylinder, and means for securing the plates together with the cylinder therebetween, said porous metal cylinder being made of sintered bronze spheres having mutual points of tangential contact, said cylinder being slidably mounted on each of said plates such that said cylinder is readily removable therefrom.

4. A filter unit comprising a top cover plate having a plurality of recesses formed in one surface thereof, said top cover plate having a plurality of openings formed therethrough in communication with the central portion of each of said recesses and in communication with the opposite surface of said top cover plate, a lower cover plate having a plurality of recesses formed therein, the recesses in said lower cover plate being disposed in alignment with the recesses in said upper cover plate, a plurality of cylindrical filter elements, each of said filter elements being formed of sintered metallic spheres having tangential points of mutual contact, opposite ends of each of said cylinders being disposed within an aligned pair of recesses in said top cover plate and said lower cover plate, sealing means disposed between the ends of each of said cylinders and the associated recesses, and means for securing said top cover plate and said lower cover plate to one another and clamping said cylinders in said recesses, the opposite ends of each of said cylinders being slidably disposed within the associated recesses for ready removal therefrom.

5. Apparatus as defined in claim 4 wherein said sealing means associated with the ends of each of said cylinders comprises a substantially cup-shaped plastic member disposed within the associated recesses, each of said cup-shaped members having a central opening formed in the bottom wall thereof, a foraminous tube disposed within said cylinder and projecting from opposite ends thereof, each end of said tubes being received within the central opening formed in the associated cup-shaped member.

6. A filter including a body member having an inlet and an outlet, a hollow cover member secured to said body means, a filter unit supported by said body means and disposed within and spaced from said cover member, said inlet being in communication with the interior of said cover member, said filter unit including a top cover plate having one surface thereof in communication with said outlet, a plurality of recesses formed in the opposite surface of said top cover plate, said top cover plate having a plurality of openings formed therethrough, each of said openings being of smaller dimensions than said recesses and being in communication with the central portion of one of said recesses, said openings also being in communication with said upper surface of said top cover plate, a bottom cover plate having a plurality of openings formed in the upper surface thereof in opposed facing relationship to the recesses formed in said top cover plate, a plurality of substantially cylindrical filter elements formed of sintered metallic spheres, each of said filter elements having a metallic ferrule mounted on opposite ends thereof, a substantially cup-shaped plastic sealing member disposed within each of said recesses and mounted between the walls of the recesses and the ferrule of the associated filter element, each of said sealing members having a central opening formed in the bottom wall thereof, a metallic foraminous tube disposed within each of said cylindrical filter elements and having an outer diameter substantially equal to the inner diameter of the associated filter elements, said tubes being of greater length than said filter elements and projecting beyond opposite ends thereof, the opposite ends of each of said tubes being received within the central openings in said sealing members, and a clamping bolt for securing said top cover plate and said lower cover plate to one another, said lower cover plate having a central opening formed therethrough, said clamping bolt extending through said last mentioned opening and having one end thereof secured to said top cover plate.

7. Apparatus as defined in claim 6 wherein said clamping bolt includes an enlarged collar portion abutting the lower surface of said lower cover plate, said clamping bolt having a spring receiving portion formed at the lower end thereof, and a spring seated in said spring receiving means of the clamping bolt and abutting the inner surface of said cover member for urging said filter unit towards said body means.

8. A filter unit comprising a top cover plate and a spaced bottom plate, each of said cover plates having a plurality of spaced recesses formed in the opposed surfaces thereof, the recesses in said lower plate being disposed in alignment with the recesses in said upper plate, each of said recesses having lateral walls defining a substantially cylindrical surface, a plurality of substantially cylindrical filter elements, each of said filter elements being formed of sintered metallic spheres having tangential points of mutual contact, a substantially cup-shaped ferrule mounted on each end of said filter elements, and a substantially cup-shaped plastic sealing member disposed within each of said recesses, the inner walls of said plastic sealing members being substantially cylindrical and the outer surfaces of said ferrule being substantially cylindrical whereby the filter elements are readily removable from the plastic sealing members, and the plastic sealing members are readily removable from the recesses in the associated cover plates, said top cover plate and said bottom cover plate being separate members, and clamping means engaging said top cover plate and said bottom cover plate for clamping the filter elements between the cover plates and maintaining them in proper operative position.

9. Apparatus as defined in claim 8, including a perforated sleeve disposed within each of said filter elements and engaging the inner surface thereof, said perforated sleeves extending beyond the opposite ends of said filter elements such that said perforated sleeve engages the bottom wall of the recesses of the associated cover plate at opposite ends thereof.

References Cited in the file of this patent
UNITED STATES PATENTS

| 2,327,805 | Koehring | Aug. 24, 1943 |
| 2,430,078 | Reinsch et al. | Nov. 4, 1947 |
| 2,562,730 | Miller | July 31, 1951 |

FOREIGN PATENTS

| 572,996 | Great Britain | Nov. 1, 1945 |